H. A. WRENN.
CALCULATING MACHINE.
APPLICATION FILED JUNE 20, 1919.
1,438,419.
Patented Dec. 12, 1922.
11 SHEETS—SHEET 3.
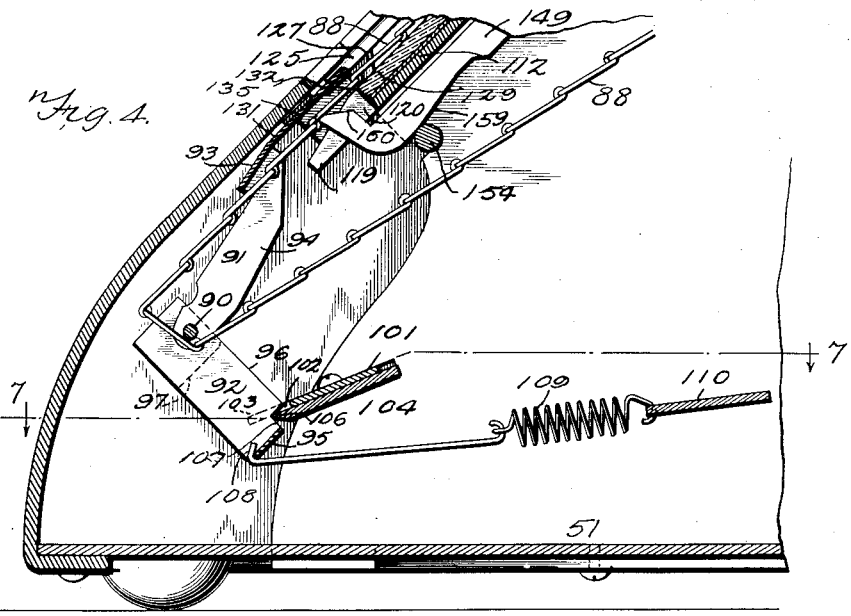
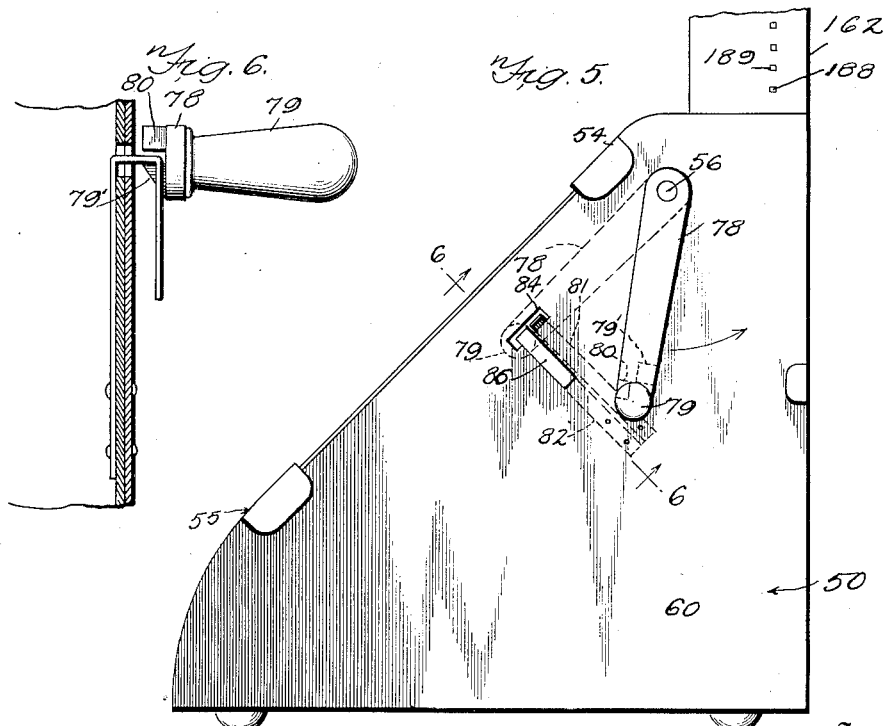
Inventor
HERBERT A. WRENN,
By C. L. Parker
Attorney H. A. WRENN.
CALCULATING MACHINE.
APPLICATION FILED JUNE 20, 1919.
1,438,419.
Patented Dec. 12, 1922.
11 SHEETS—SHEET 4.
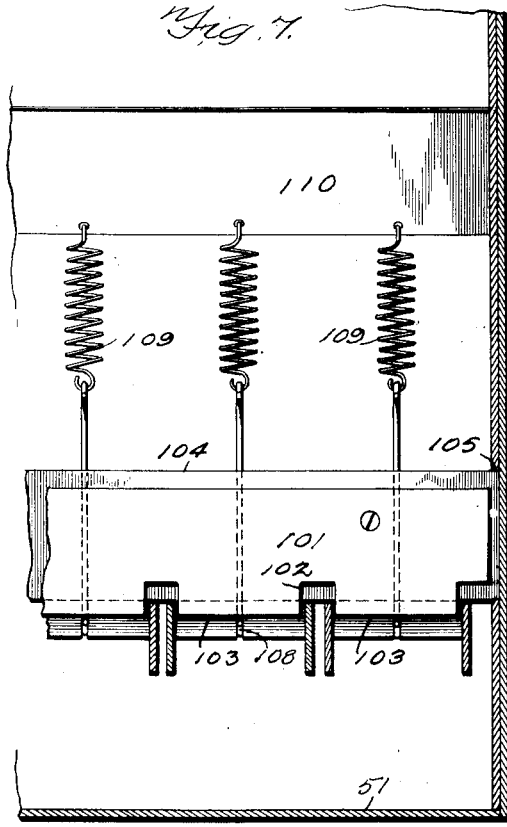
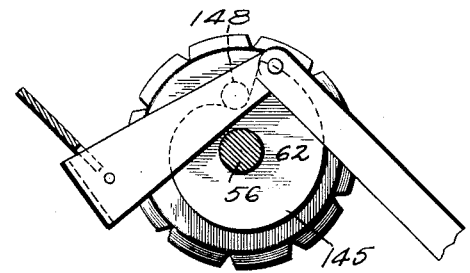
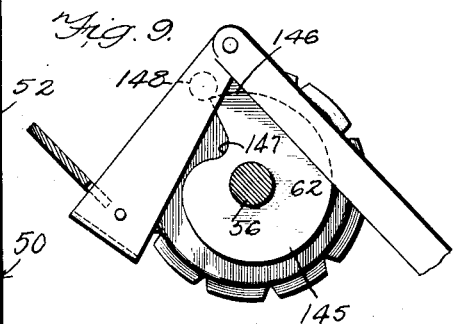
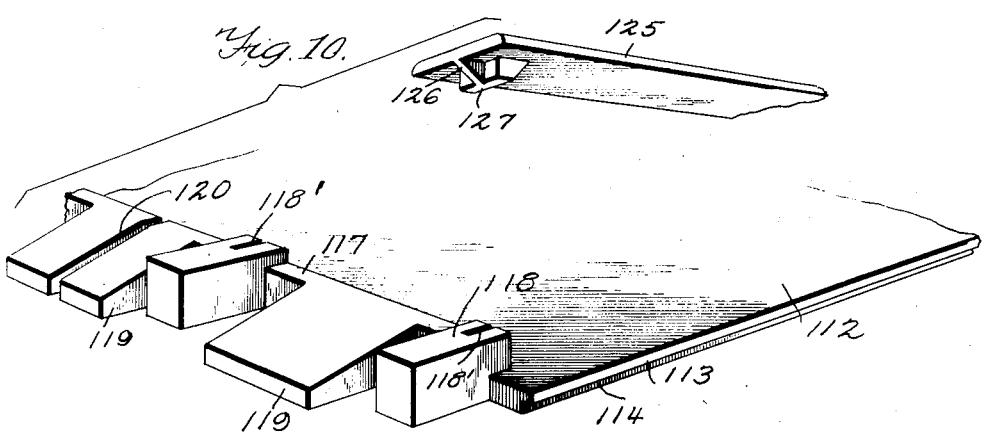
Inventor
HERBERT A. WRENN,
By C. L. Parker
Attorney

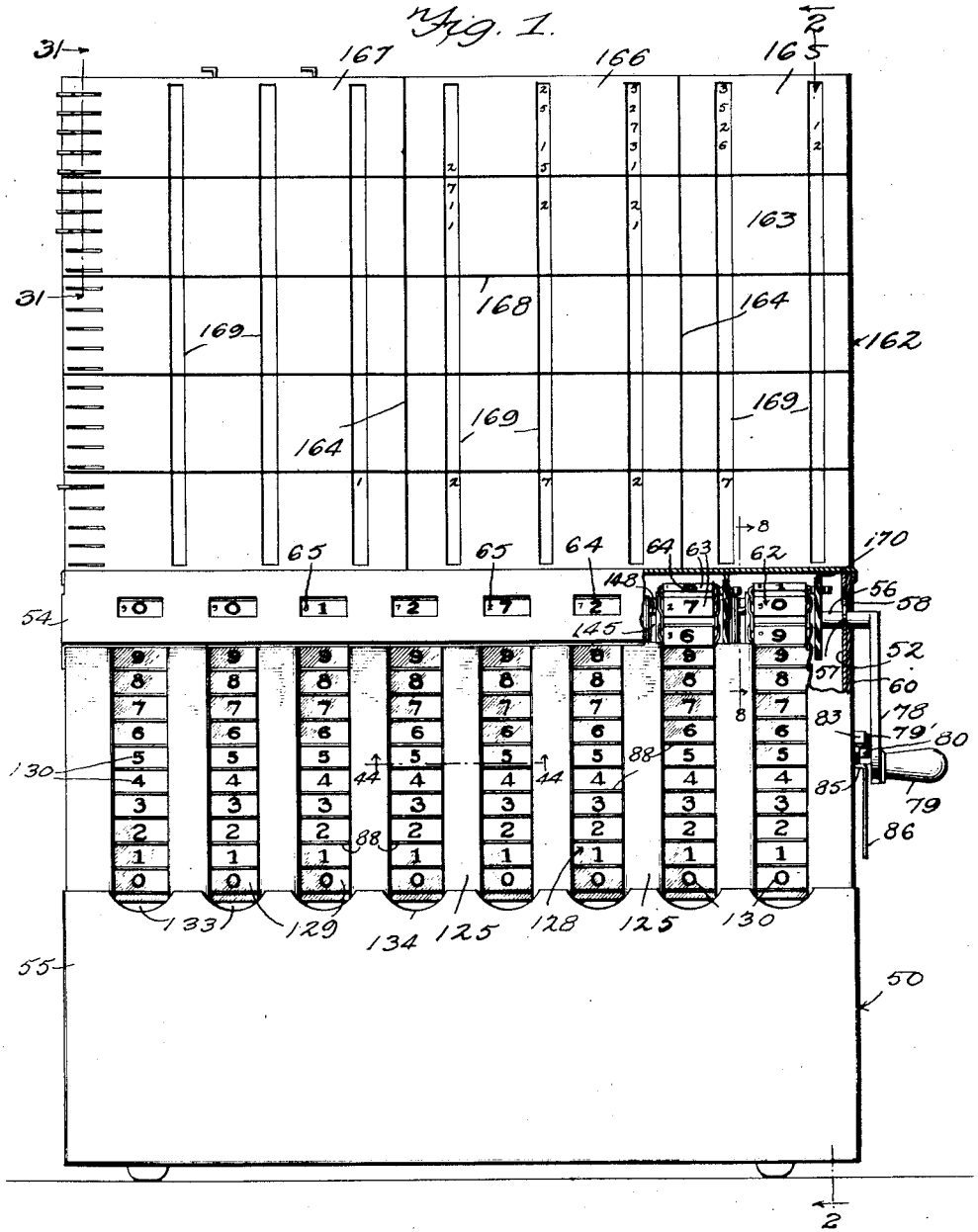

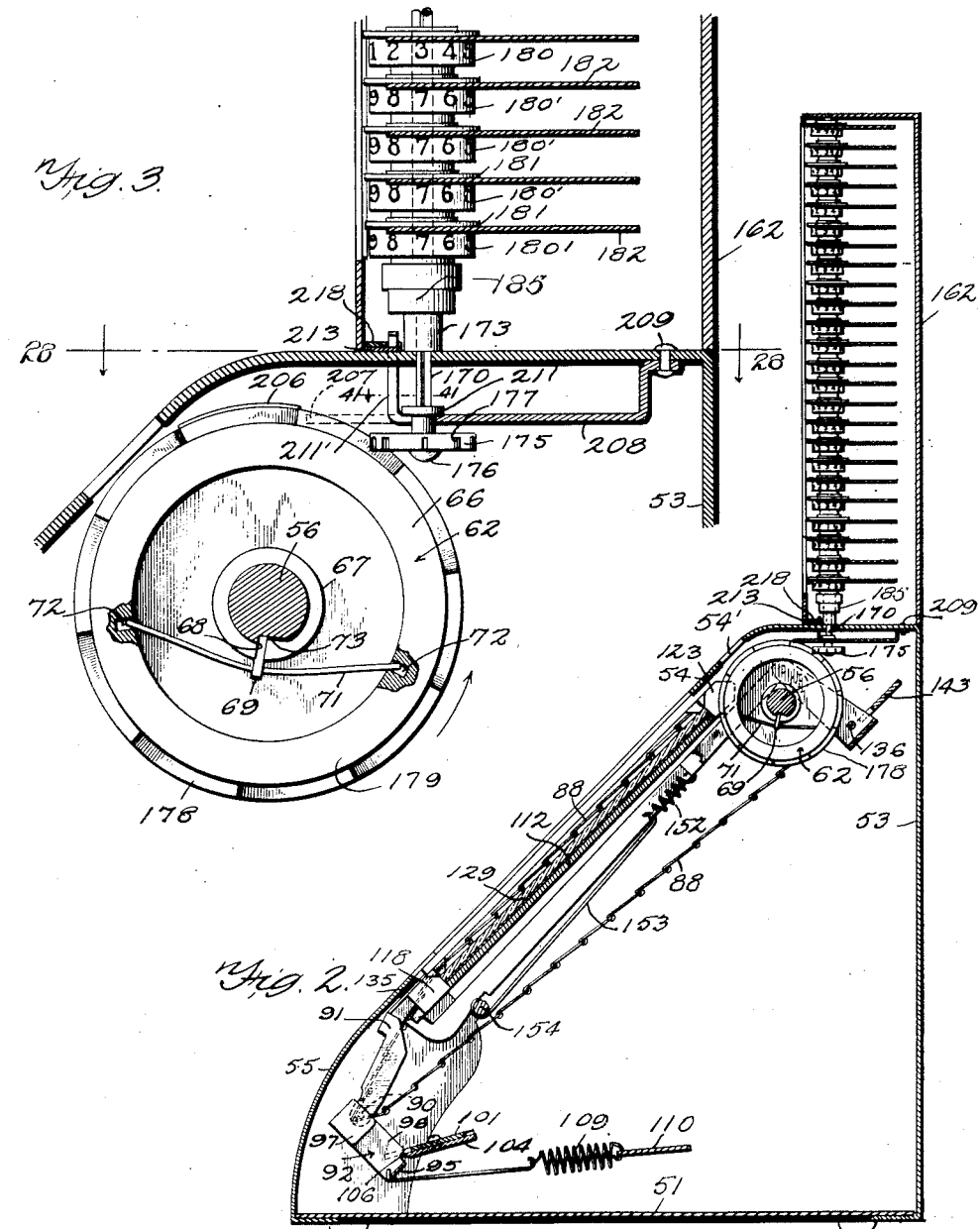

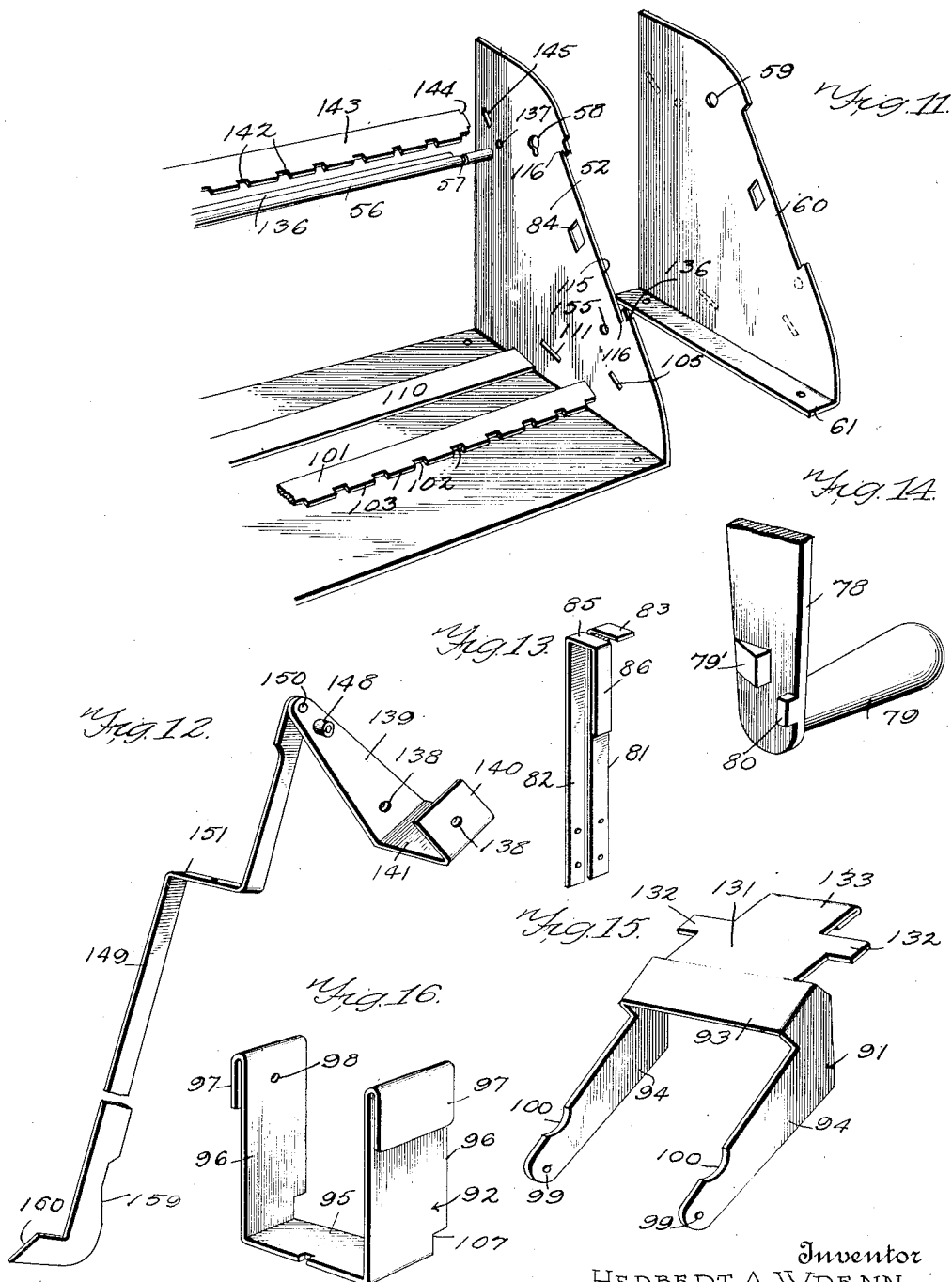

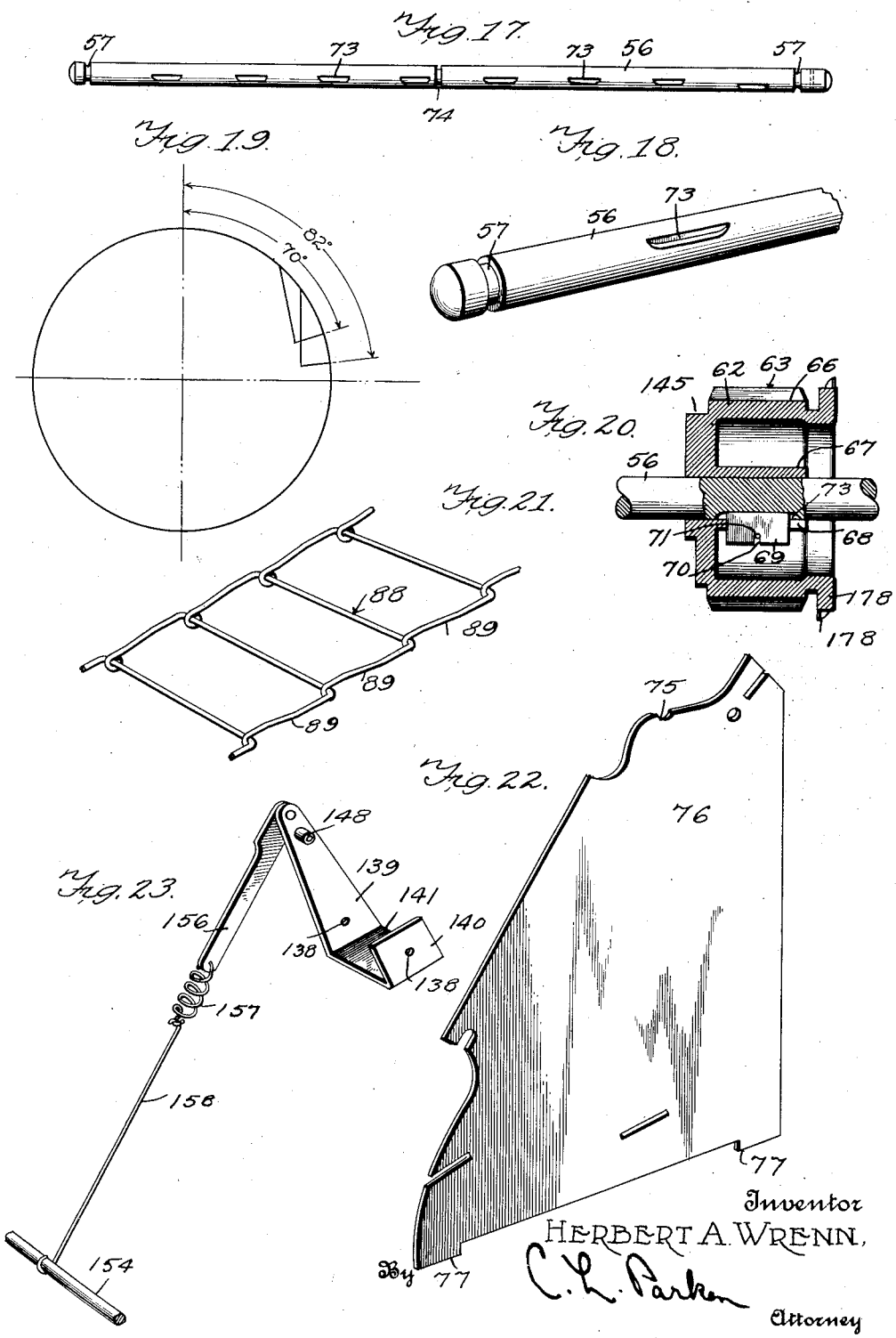

H. A. WRENN.
CALCULATING MACHINE.
APPLICATION FILED JUNE 20, 1919.
1,438,419.
Patented Dec. 12, 1922.
11 SHEETS—SHEET 7.
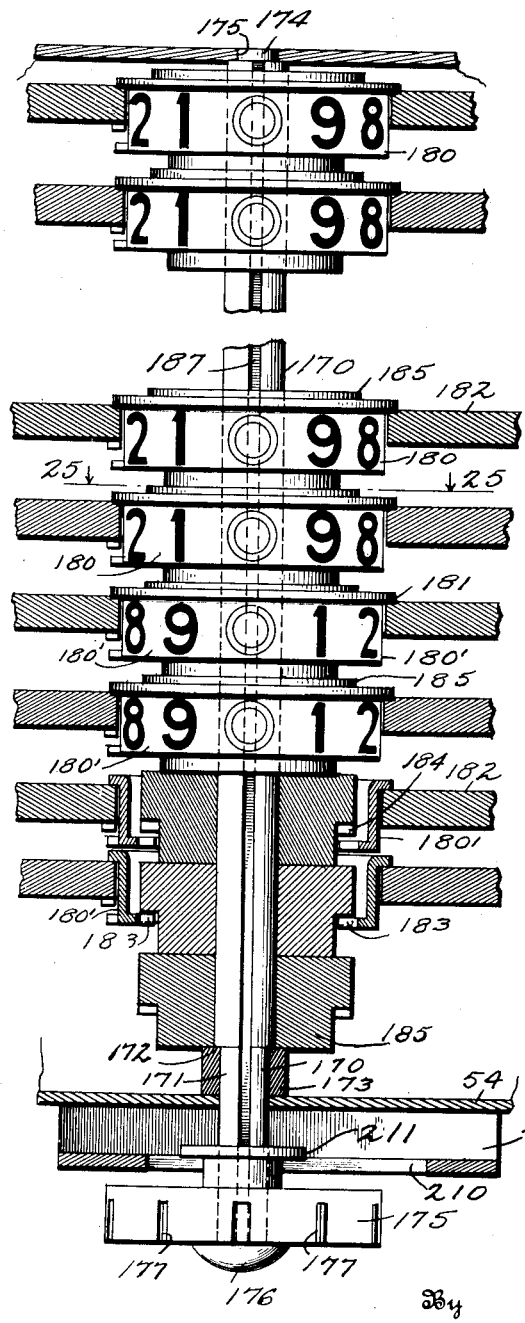
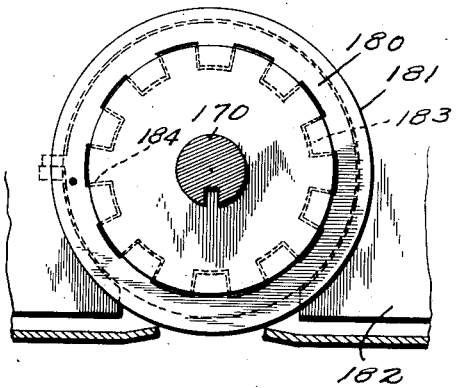
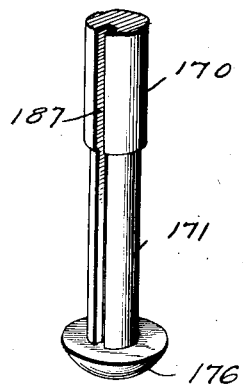
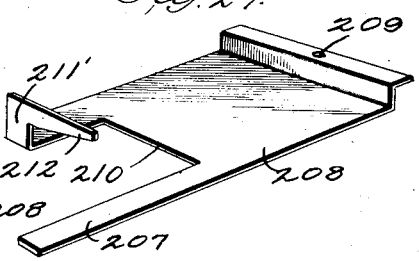
Inventor
HERBERT A. WRENN,
By C. L. Parker
Attorney H. A. WRENN.
CALCULATING MACHINE.
APPLICATION FILED JUNE 20, 1919.
1,438,419.
Patented Dec. 12, 1922.
11 SHEETS—SHEET 8.
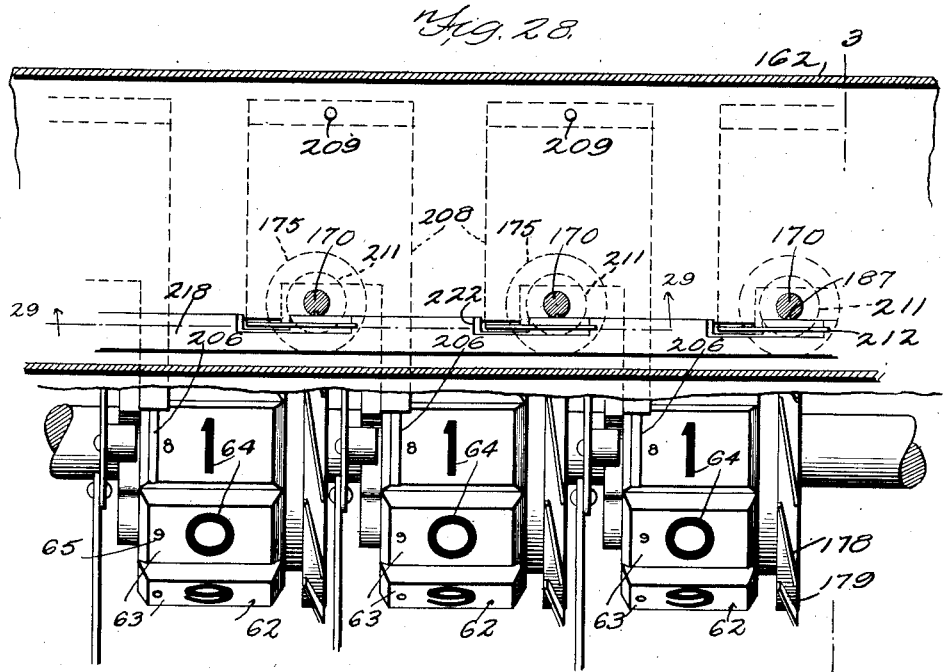
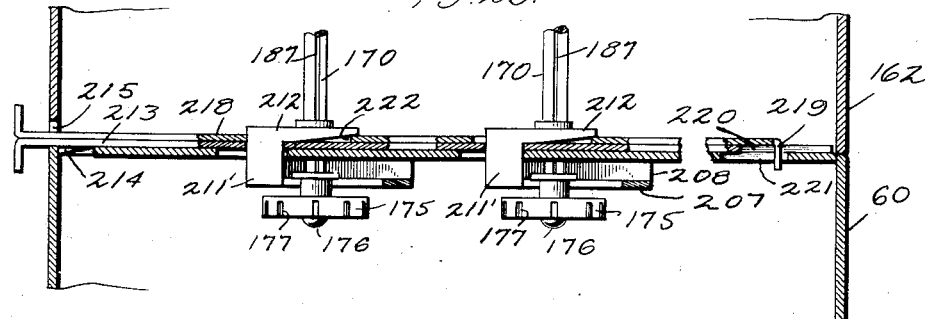
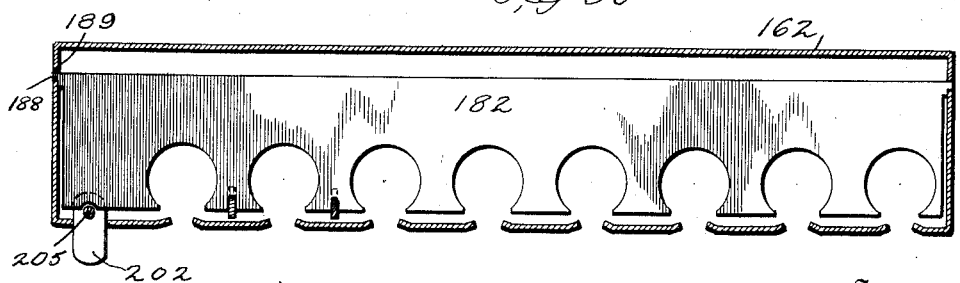
Inventor
HERBERT A. WRENN,
By C. L. Parker, Attorney

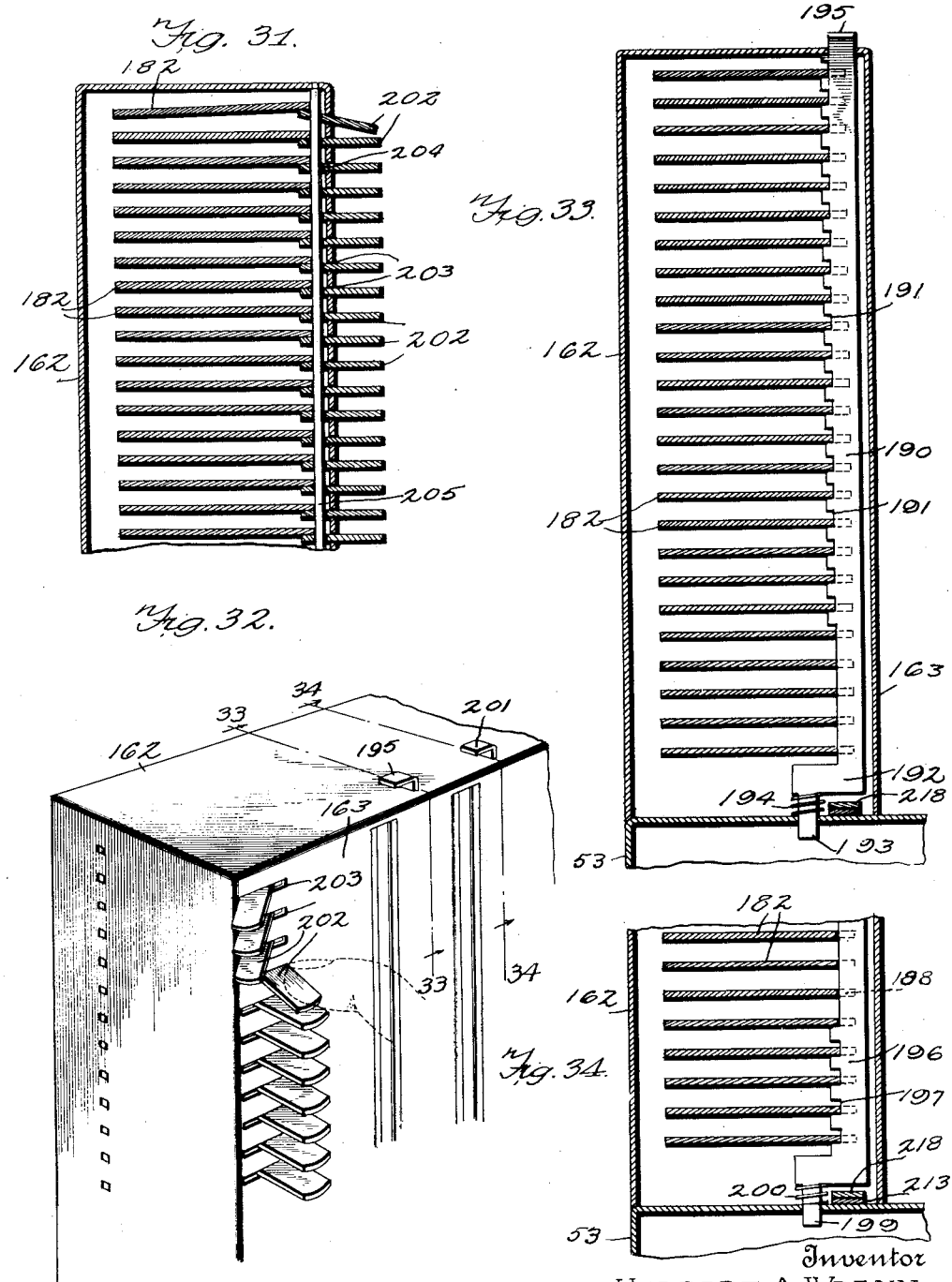

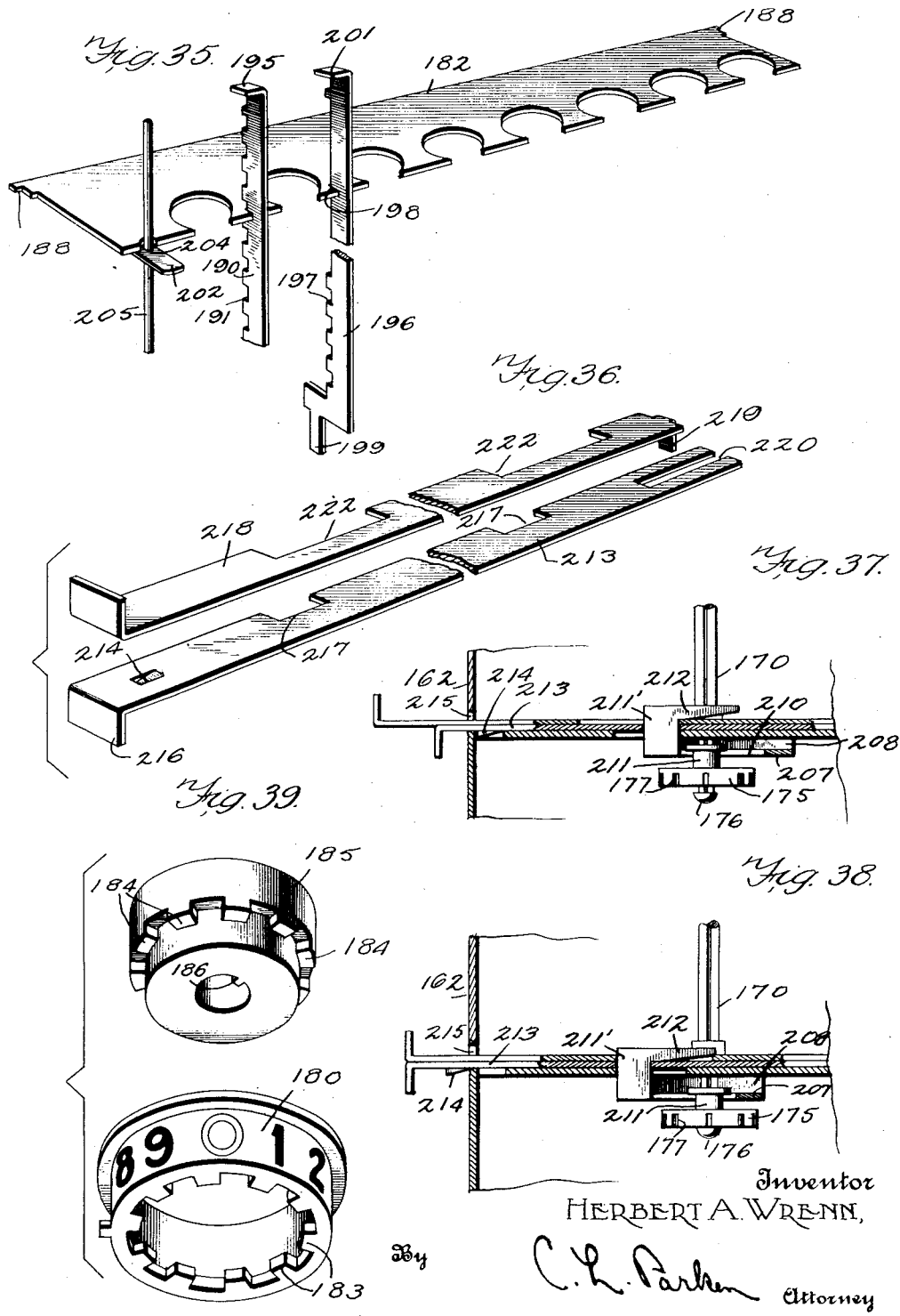

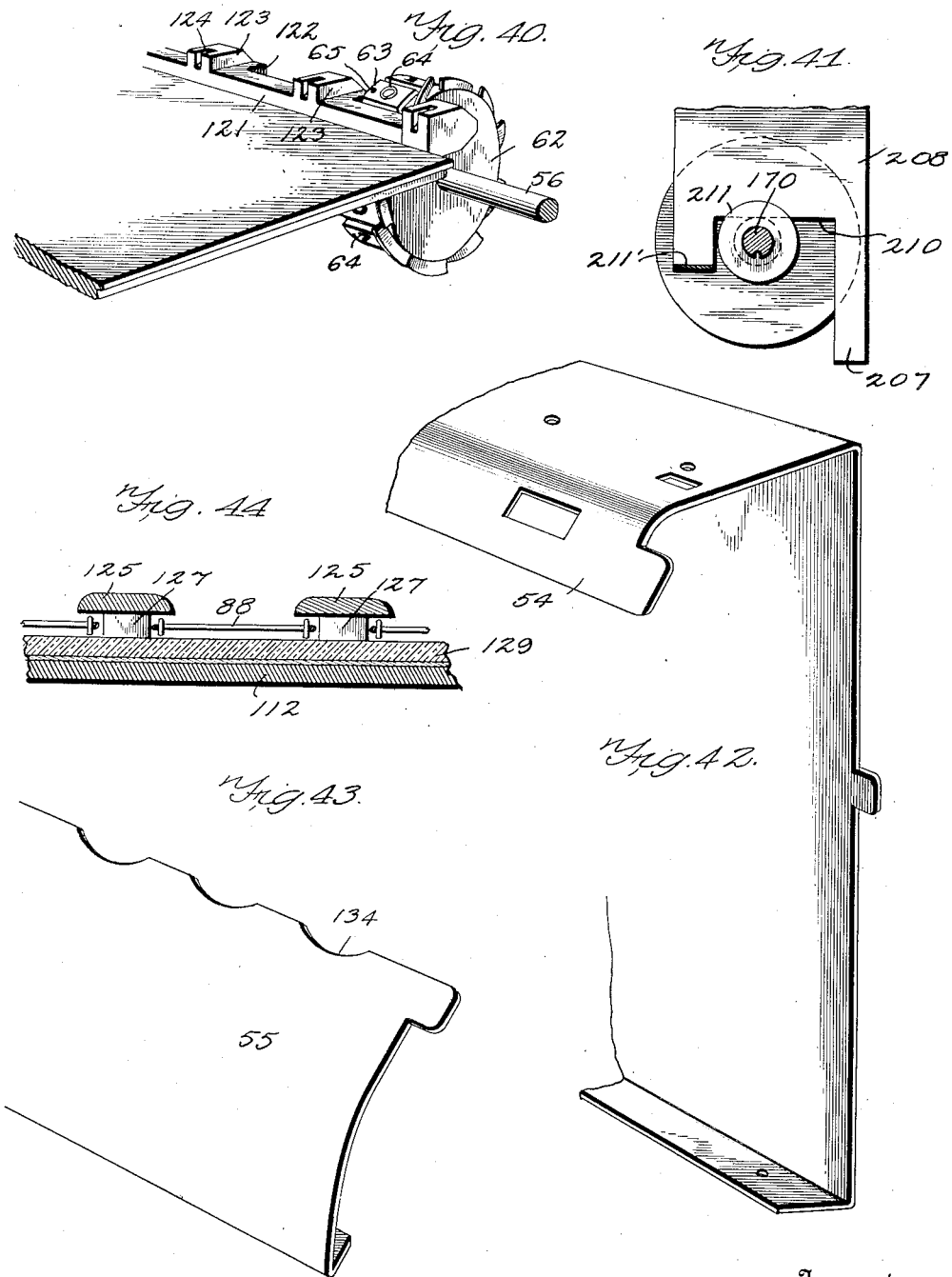

Patented Dec. 12, 1922.

1,438,419

UNITED STATES PATENT OFFICE.

HERBERT A. WRENN, OF WASHINGTON, DISTRICT OF COLUMBIA, ASSIGNOR TO WRENN ADDING MACHINE COMPANY, OF WASHINGTON, DISTRICT OF COLUMBIA, A CORPORATION OF DELAWARE.

CALCULATING MACHINE.

Application filed June 20, 1919. Serial No. 305,517.

*To all whom it may concern:*

Be it known that I, HERBERT A. WRENN, a citizen of the United States, residing at Washington, in the District of Columbia, have invented certain new and useful Improvements in Calculating Machines, of which the following is a specification.

My invention relates to calculating machines.

An important object of the invention is to provide a machine of the above-mentioned character, which may be employed to add and substract.

A further object of the invention is to provide a listing apparatus which operates in connection with the calculating machine, to provide a record of the separate items being added.

A further object of the invention is to provide means actuated by the operation of the calculating machine to total the items in the listing apparatus, and to clear the items in the listing apparatus and their total when desired.

A further object of the invention is to provide separate means to clear the items in the listing apparatus and separate means to clear the total of such items.

Other objects and advantages of the invention will be apparent during the course of the following description.

In the accompanying drawings forming a part of this specification, and in which like numerals are employed to designate like parts throughout the same:

Figure 1 is a front elevation of the machine, a portion being shown in section for the purpose of illustration;

Figure 2 is a vertical transverse sectional view, taken on line 2—2 of Figure 1;

Figure 3 is a transverse vertical sectional view, on an enlarged scale, taken on line 3—3 of Figure 28;

Figure 4 is an enlarged transverse sectional view similar to Figure 2, showing the operating chains and associated elements, the upper portion of the machine being broken away;

Figure 5 is an end elevation of the apparatus, the listing apparatus being broken away;

Figure 6 is a longitudinal sectional view, taken on line 6—6 of Figure 5;

Figure 7 is a horizontal sectional view, taken on line 7—7 of Figure 4;

Figure 8 is a transverse section, taken on line 8—8 of Figure 1;

Figure 9 is a similar view, showing the transferring mechanism in the raised position;

Figure 10 is a perspective view, showing the operating board or plate and a dividing strip;

Figure 11 is a perspective view of the casing of the calculating machine, the outer cover plate being shown separated from the end of the casing;

Figure 12 is a perspective view of the transfer trip arm;

Figure 13 is a similar view of the stop device for the handle;

Figure 14 is a fragmentary perspective view of the operating handle;

Figure 15 is a perspective view of the upper member of the device to prevent overrunning of the chain and associated elements;

Figure 16 is a similar view of the lower portion of the device;

Figure 17 is a side elevation of the horizontal shaft which carries the number wheels;

Figure 18 is an enlarged fragmentary perspective view of one end of the same;

Figure 19 is a diagrammatic view illustrating the arrangement of the notches in the number wheel carrying shaft;

Figure 20 is a longitudinal sectional view through a number wheel;

Figure 21 is a fragmentary perspective view of the operating chains;

Figure 22 is a perspective view of a center plate of the casing;

Figure 23 is a perspective view of a tension device for the listing number wheel;

Figure 24 is an elevation of the number wheels of the listing apparatus, certain of the elements being shown in vertical section for the purpose of illustration;

Figure 25 is a horizontal sectional view, taken on the line 25—25 of Figure 24;

Figure 26 is a fragmentary perspective view of the operating shaft for the listing number wheels;

Figure 27 is a perspective view of a gear shifting device embodied in the apparatus;

Figure 28 is a horizontal sectional view, taken on line 28—28 of Figure 3, with a portion of the lower casing broken away;

Figure 29 is a vertical sectional view, taken on line 29—29 of Figure 28;

Figure 30 is a horizontal sectional view through the casing of the listing apparatus, parts being removed to show the pivoted operating or shifting plate;

Figure 31 is a vertical sectional view, taken on the line 31—31 of Figure 1.

Figure 32 is a perspective view of the casing for the listing apparatus, a portion thereof being broken away;

Figure 33 is a vertical sectional view, taken on line 33—33 of Figure 32, showing the resetting means for the listing number wheels, portions being omitted for the purpose of illustration;

Figure 34 is a similar view, taken on line 34—34 of Figure 32, showing the resetting means for the total number wheels of the listing apparatus, portions being omitted for the purpose of illustration;

Figure 35 is a perspective view of one of the shifting plates of the apparatus, together with associated elements;

Figure 36 is a prespective view of a device adapted to be operated for causing the transfer mechanism of the calculating machine to act upon the listing apparatus, and to be further operated for completely disconnecting the listing apparatus from the calculating machine;

Figure 37 is a view similar to Figure 29, showing the operating parts in a position to entirely disengage the listing apparatus of the calculating machine;

Figure 38 is a similar view, showing the elements in a position whereby the transfer mechanism of the calculating machine will actuate the listing apparatus;

Figure 39 is a perspective view of a number wheel and clutch of the listing apparatus, the elements being separated for the purpose of illustration;

Figure 40 is an enlarged perspective view of the upper end of the operating board, showing the shaft 56 and one of the number wheels;

Figure 41 is a section on the line 41—41 of Figure 3;

Figures 42 and 43 are enlarged fragmentary perspective views of the plates 54 and 55, respectively; and Figure 44 is an enlarged section, taken on the line 44—44 of Figure 1.

Attention being first called to Figures 1, 2, 3, 4, 5, 7, 10, 11, the numeral 50 designates the casing of the calculating machine, as a whole, this casing comprising a bottom 51, ends 52, a back 53, and upper and lower front sections 54 and 55. The ends 52 are preferably integral with the bottom 51, forming a U-shaped structure, while the back 53 and front sections 54 and 55 are preferably separate therefrom, being secured thereto by any suitable means.

As more clearly shown in Figures 1, 2, 11, 17, 18 and 20, the numeral 56 designates a shaft which carries the number wheels of the calculating machine. This shaft is provided at each end with an annular groove forming a reduced neck or shank 57. The end of the shaft is adapted to be inserted through the large portion of a key-hole opening 58 formed in the end 52 of the casing, subsequently to which the shaft 56 is moved downwardly, so that the shank 57 enters the lower reduced portion of the key-hole opening, the shaft being retained in this position by projecting into an opening 59 formed in the retaining plate 60. This retaining plate is adapted to fit upon the outer side of the end 52 and is provided at its lower end with the flange 61 projecting under the same. The retaining plate 60 is secured to the end 52 by screws or the like. It is thus seen that the shaft 56 is free to revolve upon its longitudinal axis but cannot partake of longitudinal movements.

A plurality of number wheels 62 are loosely mounted upon the shaft 56, these number wheels being provided with preferably flat faces 63, having sets of adding numbers 64 formed thereon, each set including 0 and 1 to 9, inclusive. The flat faces 62 are also provided with a set of subtracting numbers 65, which are reversed with respect to the set of adding numbers. The 9 in the subtracting set is arranged adjacent to 0 in the adding set, the 8 in the subtracting set arranged adjacent the 1 in the adding set, etc. It is thus seen that the pairs of numbers from the adding and subtracting sets are complements of 9.

As more clearly shown in Figures 3, 17, 18 and 20, each number wheel 62 embodies an annular outer portion 66, spaced from a hub 67, rotatable upon the shaft 56. The hub 67 is provided with a radial longitudinal slot 68, receiving a radially movable pawl 69, having a notch 70 formed therein, for receiving a suitable spring 71, the ends of which are mounted within openings 72, formed in the ring 66. The inner end of the pawl 68 is adapted to slidably engage the periphery of the shaft 56, and to drop into a recess or notch 73, formed therein. This recess or notch embodies a shoulder 74, the opposite side thereof being open, as shown. As clearly illustrated in Figure 3, the pawl and ratchet construction is such that the number wheel is capable of turning in the direction of its arrow without rotating the shaft 56, and that when this shaft is turned in the same direction or in the direction of its arrow it will rotate the number wheels, when the pawl 69 enters the recess or notch 73. As clearly shown in Figure 17, the notches or recesses 73, excepting the end notch or recess to the right, are disposed in longitudinal alinement. The end recess 73, to the right, is disposed in advance of the other notches, preferably 12 degrees. As clearly shown in Figure 19, the notches or recesses 72, excepting the end notch, are disposed 70 degrees from a perpendicular to a crank when in the set position, to be described, while the end notch 72 to the right is disposed at 82 degrees from such perpendicular. The purpose of having the end notch to the right advanced is to cause the end number wheel to the right to be cleared before the other number wheels are cleared. The shaft 56 is provided at a point equal distances spaced from its ends with an annular groove 74, rotatably receiving a notch 75 formed in a transverse partition plate 76. This transverse partition plate is preferably provided with extensions 77 at its lower end, fitting within openings in the floor or bottom 51.

Detachably and rigidly secured to one end of the shaft 56 is a crank or handle 78, having a knob 79 secured to its outer end. As more clearly shown in Figure 14, the crank 78 is provided near its outer end with a beveled lug 79', disposed near one edge of the crank and a second lug 80, which is preferably rectangular, and arranged near the other edge of the crank. As more clearly shown in Figures 5, 6, 11 and 13, the numerals 81 and 82 designate springs, arranged upon the inner side of the end 52, and suitably attached to the same. The spring 81 is bent at its free end to provide a lateral extension 83, projecting through openings 84. This extension is arranged in the path of travel of the beveled lug 79'. The spring 81 has a lateral extension 85 at its free end projecting through the openings 84 and carrying a longitudinal extension 86. This longitudinal extension is arranged in the path of travel of the lug 80, the lugs 79' and 80 being arranged at different distances from the turning point of the crank. As clearly shown in Figure 5, the crank 78 is turned counter-clockwise in advancing the number wheels, and when the crank has made a complete revolution the beveled lug 79' will first engage the extension 83, depressing the same so that the lug passes upon the forward side of this extension. The extension 83 trips over the squared end of the lug 79' and assumes a position in rear of the same, thereby positively preventing back turning of the crank. The lug 80 is brought into contact with the extension 85, and serves as a positive stop to prevent the crank being turned more than one revolution at a time. This prevents over-running of the number wheels by the crank. When it is desired to turn the crank for a second revolution, the horizontal extension 86 may be depressed by the index finger, thereby enabling the lug 80 to clear the extension 85.

The numeral 88 designates operating chains corresponding in number and arrangement with the number wheels 62, the faces 63 thereof serving as teeth for these chains. As more clearly shown in Figure 21, each chain consists of relatively rigid U-shaped links 89, the ends of which are bent to form eyes pivotally receiving the transverse portion of the end link. The chains 88 are preferably inclined, as shown, and each chain, at its lower end, passes about an element or pin 90. This pin serves to pivotally connect the upper and lower parts 91 and 92 of a checking device, serving to prevent the over-running of the chains and associated elements. The upper part 91 is in the form of a U-shaped member including a transverse portion 93 and spaced arms 94, which are arranged at a right angle thereto. The part 92 is also U-shaped and includes a transverse portion 95 carrying upstanding arms 96 the upper ends of which are bent downwardly from each other providing exterior flaps 97. The arms 96 are provided near their upper ends with apertures 98, for receiving the pin 90, the ends of the pin being inserted through the apertures 98 by springing the arms 96 apart sufficiently. The free ends of the arms 94 of the upper part are apertured as shown at 99, to receive the ends of the pin 90, such apertured ends of the arms 94 being inserted between the flaps 97 and the sides 96. It is thus apparent that the upper and lower parts 94 and 95 are pivotally connected. The arms 94 are preferably provided with recesses 100, to provide sufficient space or clearance for the operation of the parts.

As more clearly shown in Figures 2, 7 and 11, the numeral 101 designates a combined supporting and spacing strip or element, being provided with equally distantly spaced notches 102 forming teeth 103. The ends of the strip 101 contact with the ends 52 and a second strip 104 arranged beneath the strip 101, and secured thereto by screws 105 or the like. The strip 104 projects at its ends beyond the strip 101 and enters slots or openings 105 formed in the ends 52, these ends contacting with the plates 60, to prevent longitudinal displacement of the elements 101 and 104. At its forward edge the strip 104 has a knife edge 106, fitting in notches 107, formed in the sides 96 of the lower parts 92, thereby serving as a pivoted support for the same. The sides 92 project into the notches 102, and are thereby held against lateral displacement. Connected with each lower part 96 is a hook 108, the rear end of which is secured to a retractile coil spring 109, attached to an anchor plate or strip 110, the ends of which project into slots 111, formed in the ends 52, such projecting ends contacting with the plate 60, as shown. From the foregoing description, it will be seen that the spring 109 normally tends to swing the checking device downwardly, thereby retaining the operating chain 88 taut. Due to the peculiar construction of the operating chain and its engagement with the pin 90, when the operating chain is advanced each step, the checking device is swung upwardly. If the checking device is held against this upward movement, the chain cannot be advanced.

The numeral 112 designates a preferably inclined operating board, shown more clearly in Figures 2, 10 and 40. Each end of this operating board is provided with a reduced tongue or extension 113, forming a shoulder 114. The tongue 113 projects into the recess 115, formed in the end 52, shown in Figure 3. The ends of the tongue 113 project into notches 116, at the ends of the recess 115. It is thus seen that this operating board will be securely held in place. At the lower end of the operating board 12 is a horizontal flange 117, preferably integral therewith, carrying attaching elements or lugs 118 also preferably integral with the operating board. The lugs 118 project above the flange 117 and the operating board 112 for a substantial distance. Arranged between the lugs 118 are inclined guide elements 119, having a longitudinal slot 120, for a purpose to be described. At the upper end of the operating board 112 is a horizontal flange 121, preferably formed integral therewith and projecting above the same for a substantial distance. Spacing elements or lugs 122 are preferably formed integral with this flange and are disposed between the number wheels 62, to prevent their moving longitudinally upon the shaft 56. Formed integral with the flange 121 are attaching elements or lugs 123, having slots 124, in alinement with the slots 118'. The numeral 125 designates spacing strips or bars, as shown more clearly in Figures 1, 2, 10 and 44. At the ends of these spacing strips or bars, upon the lower sides thereof, are longitudinal lugs 126 and transverse lugs 127. The longitudinal lugs 126 are adapted to enter the grooves 118' and 124, while the transverse lugs 127 contact with the inner ends of the attaching lugs 118 and 123, thereby preventing longitudinal displacement of the spacing strips 125. The ends of the spacing strips project beneath the front casing sections 54 and 55, and are held thereby against upward displacement. The operating chains travel over the inclined guides 119 and their longitudinal edges and eyes travel beneath the edges of the spacing strips 125, and are completely concealed thereby. These spacing strips afford longitudinal openings 128 therebetween, through which the operating chains are visible and operate. Arranged upon the operating board 112 and beneath the lugs 126 and 127 of the spacing strips is a section of transparent material 129, which is preferably formed of glass. This section of glass contacts with the flanges 117 and 121, and is held thereby against vertical displacement, and is also held against longitudinal displacement by the ends 52. Arranged between this section of glass 129 and the operating board 112 is a sheet of paper or the like, having sets of numbers 130 printed thereon, which sets of numbers are visible through the openings 128 and appear beneath the operating chains. Each set of numbers includes 0 and 1 to 9, inclusive, as shown, and these numbers serve to indicate the desired extent of operation of each chain. I preferably print the first two sets of numbers to the right black on white, the next three sets of numbers to the left white on black, and the last three sets of numbers to the left black on white, it being understood that the invention is in no sense restricted to this idea.

As more clearly shown in Figures 12 and 15, each upper part of the checking device has a plate 131, rigidly secured to the transverse portion 93 thereof and preferably formed integral therewith. This plate carries laterally extending ears 132 slidable upon the top of the lugs 118, there being a space afforded by the spacing strips 125. The plate 131 further carries an extension 133, which projects into recesses 134, and is arranged upon the outer side of the operating chain, in the path of travel of the finger or stylus employed to operate the chain, whereby the finger or stylus will contact with the extension 133 of the plate 131 when brought into the end of the normal stroke of the chain. It is thus seen that the finger will serve to hold the checking device against upward movement, thereby making it impossible for the chain to partake of overrunning movement. As shown in Figure 2, a strip 135 which may be formed of metal or the like, is arranged to slidably contact with the top of the plate 131, and the ends of this strip are held within openings or notches 136 formed in the ends 52. When the first number wheel 62 to the right has been advanced until 9 shows in the opening 54', if this number wheel is advanced a step further so that 0 appears in this opening, transfer mechanism is provided to advance the next number wheel one step so that 1 will appear in the corresponding opening 54', or be added to the number appearing in such opening, the same operation occurring for each succeeding number wheel. This transfer mechanism comprises a pivot rod 136 horizontally arranged and having its ends projecting into the openings 137. This rod passes through openings 138 formed in the arms 139 and 140 of vertically swinging brackets 141. The arms 139 and 140 project into openings or notches 142, formed in a spacing strip or bar 143, having reduced ends 144, passing into openings 145 in the ends 52. It is thus seen that the pivoted brackets 141 are held against lateral displacement but are free to swing in vertical planes. These brackets are arranged so that their arms 139 are disposed near and upon corresponding sides of the operating sides of the number wheels 62. These number wheels are provided with cams 145, as shown more clearly in Figures 8 and 9. The cams 145 have shoulders 146 and recesses 147. The arm 139 is provided with a roller 148, pivoted thereto, and arranged to contact with the cam 145. Pivotally connected with all of the swinging brackets 141, as at 150, excepting the bracket to the extreme left, is a reciprocatory transfer bar 149. This transfer bar has a shoulder 151, to which is secured a rectractile coil spring 152, the lower end of which is connected with an attaching element 153 secured to an anchor rod 154. This anchor rod is adapted to have its ends passed into openings 155. The end bracket 141 to the left has pivotal connection with a link 156, having a retractile coil spring 157, connected therewith. The attaching element 158 is secured to the lower end of this spring and engages the rod 154. While transfer mechanism is not employed in connection with the last number wheel to the left, the bracket 141 has yielding means connected therewith and is employed in order that the operating chain to the left end will have the same touch in operation with the other chains. As shown in Figures 2 and 4, the lower portion of the transfer bar 149 has an inclined or cam face 159, slidably contacting with the anchor rod 154 to be supported thereby. When in the upper position, the cam face 159 receives the transfer bar, so that the upwardly projecting extension 160 thereof will project into the link of the operating chain, and contact with the transverse portion thereof, this extension having a rear inclined face. When the cam 145 trips the bar 149, which occurs when the operating wheel thereof has been advanced 10 steps, the transfer bar will automatically move downwardly to advance the next operating chain one step, the extension 160 being slightly lowered with relation to the chain.

The listing apparatus comprises preferably a vertically arranged casing 162, disposed upon the top of the casing of the calculating machine. This casing 162 has its forward side or face 163 preferably painted black, and provided with vertical lines 164, dividing the same into cents, hundreds of dollars and thousands of dollars sections 165, 166 and 167. The face 163 is also horizontally ruled, as shown at 168, serving as guides in reading horizontal sets of numbers. The face 163 is provided with sets of vertically arranged openings 169 corresponding in number and arrangement to the number wheels, as clearly shown in Figure 1.

The number 170 designates preferably vertically arranged operating shafts, corresponding in number and arrangement to the number wheels. The lower end of each operating shaft 170 is provided with a cylindrical reduced portion 171, forming a shoulder 172. A ring 173 is rotatable on this reduced portion and rests upon the front section 54 of the casing, to be supported thereby. The upper end of each operating shaft 170 has a reduced cylindrical portion 174, rotatable in an opening 175 formed in the top of the casing 162. It is thus seen that the shaft 170 is free to rotate but cannot move longitudinally.

Each shaft is adapted to be geared with the corresponding number wheel to be driven thereby, and for this purpose a horizontal worm wheel 175 is keyed to the lower portion thereof, to rotate therewith and to be moved longitudinally of the same, downward, displacement of this worm wheel being prevented by a head 176 carried by the lower end of the shaft 170. A worm wheel 175 is provided with ten notches 177, adapted to receive ten teeth 178, carried by a worm 179, which is preferably formed integral with the number wheel, as clearly illustrated in Figures 20 and 28. It is thus apparent that when the worm wheel 175 is in the lowermost position, as the number wheel is advanced such movement will be transmitted to the operating shaft 170, advancing the same in a corresponding manner.

Each operating shaft 170 is surrounded by a plurality of spaced superposed number wheels 180, which are hollow, and provided at their upper ends with annular flanges 181. These annular flanges slidably contact with the top of shifting plates 182. Each number wheel 180 is provided at its lower end with an annular set of clutch teeth 183, to engage and disengage a corresponding set of clutch teeth 184, formed upon an inner clutch element 185. This clutch element is provided with a key 186, as shown in Figure 39, extending into the longitudinal slot 187, formed in the operating shaft. In Figure 2 I have shown twenty upper item wheels 180 and four lower total item wheels 180'. The total item wheels 180' are provided with numbers, including 0 and 1 to 9, inclusive, and the total item wheels 180′ also include these numbers but the numbers of the total item wheels run in an opposite direction to those of the item number wheels. The numbers on the item number wheels 180 are advanced in a similar manner to the numbers on the number wheels of the calculating machine, and the total number wheels 180′ are advanced when the number wheels of the calculating machine are cleared, which involves a different operation. When the 0 of the number wheel in the calculating machine is visible through the opening 54′, the pawl 74 will lock this wheel to the shaft 56 against rotation in one direction so that the shaft will at once take up or turn the number wheel. If any other number appears in the opening 54′, the shaft 56 will have to be turned a corresponding number of steps before it will take up in turn the number wheel. To illustrate, if the number 8 appears in the opening 54′, to clear the number wheel, the crank will have to be turned eight steps before it would take up or turn the number wheel, which would then be turned two steps before the number wheel is cleared. In order to transfer this 8 to the total item wheels, the total item wheel will only be rotated two steps and in order that 8 will appear at the proper opening, their numbers will have to be reversed. The clutch elements 185 are arranged in superposed relation and contact with each other, and therefore cannot partake of any perceptible operating movement upon the longitudinal shaft but are adapted to rotate therewith. It is thus seen that the rotation of the shaft will be transmitted to a selected number wheel 180 when the same is raised so that the clutch teeth 183 engage the clutch teeth 184.

Each shifting plate 182, as more clearly shown in Figure 35, is provided near its rear edge with a pivoted extension 188, projecting into openings 189 in the casing 162. The upper plates 182 which control the operation of the item number wheels are supported in a horizontal position by a vertical reciprocatory bar 190, such bar having spaced superposed notches 191 formed therein, receiving the forward edge of the plates, and these notches are sufficiently long to permit of slight vertical swinging movement of the plates by means to be described. The bar 190 is provided at its lower end with a shoulder 192, which carries an extension 193 operating through an opening in the casing section 54. The bar 190 is supported by a compressible spring 194, as shown. At its upper end the bar projects beyond the top of the casing 162 and is preferably bent to provide a horizontal extension or head 195. The lower plates 182 which are employed to shift the total number wheels are supported by a vertical bar 196, having notches 197 formed in its lower portion, the upper portion of the bar being smooth and slidable within notches 198 formed in the plates 182. The forward edges of the lower plates 182 project into the notches 197 and are supported therein and these notches are sufficiently long to permit of slight vertical swinging movement of the plates with relation thereto. The bar 196 is provided with an extension 199, surrounded by a coil spring 200 serving to hold the bar in the elevated position. A horizontal head 201 is formed upon the upper end of the bar 196. The shifting plates 182 are swung upwardly by means of keys 202, which are adapted to be swung vertically and horizontally the same operating within horizontal slots 203, formed in the face 163. These keys have openings 204 formed therein, for loosely receiving a stationary vertical rod 205, engaging the top of the casing 162 and the casing section 54. As clearly shown in Figure 31, a selected key 202 may be depressed, and this key will elevate the corresponding shifting plate 182, so that the number wheel 180 will be locked to the operating shaft 170 to turn therewith, when the number wheel of the calculating machine is advanced. One key 202 is depressed for operating all number wheels 180 in the same horizontal set. After the horizontal set of item number wheels have been actuated, as above indicated, so that the items appear within the openings 169, the key is swung horizontally to assume a lateral position, indicated in Figure 32, thereby dispensing with any liability of operating the same set of operating item number wheels before the same are cleared. This arrangement of the keys also clearly indicates the next set of item number wheels to be operated. Particular attention is called to the fact that the same keys are employed to operate the item number wheels and the total item number wheels, but the item number wheel keys are depressed and retained depressed while the operating chains of the calculating machine are advanced while the total item wheel keys are depressed and retained depressed while the calculating machine is being cleared.

In the operation of the item number wheels 180, it is not desired that the totals obtained in the calculating machine, and transferred from one number wheel to the other therein, be transferred to the items of the item apparatus. To prevent the transfer of totals to the item number wheels, automatic means is provided in connection with each number wheel of the calculating machine to disengage the worm wheel 175 and the worm wheel 178, at the instant that the tens from one number wheel in the calculating machine is being transferred to the next number wheel of the calculating machine. This means comprises a trip element 206 rigidly secured to one face of each number wheel of the calculating machine. The strip element 206 is arranged to contact with an extension 207 of a shifting plate 208, pivoted to the casing section 54, as shown at 209. The shifting plate 208 has a recess 210, receiving a flanged hub 211 formed integral with the worm wheel 175. When the plate 208 is elevated by its extension 207 engaging the trip 206, such plate will carry the worm wheel 175 upwardly, thereby disengaging it from the worm wheel 178, this disengagement occurring at the time that the number wheel is being advanced by the one carried over from the adjacent preceding number wheel. It might be stated at this point that the first number wheel of the calculating machine, to the right, need not have the extension 207 as there is no preceding number wheel from which the one is carried to it.

The shifting plates 208 are provided with upwardly extending arms 211', having horizontal extensions 212, and these extensions project above the casing section 54. As more clearly shown in Figures 29, 37 and 38, the numeral 213 designates a lower strip, which is disposed at a right angle to the shifting plates 208. This lower strip is mounted to slide upon the casing section 54, and has a depending lug 214 stamped therefrom. This lug normally prevents the longitudinal movement of the strip 213 in one direction, the strip projecting outwardly through an elongated opening 215. The strip 213 is provided at its free end with a down-turned portion 216. The strip 213 is provided with a plurality of notches 217, receiving the up-standing arms 211'. When the strip 213 is moved to the left, the walls of the notches 217 will engage the arm 211', and turn the shifting plates 208 upon their pivots, whereby the extensions 207 will be brought out of alinement with the trips 206, so that they will not be engaged thereby. In securing the totals of the items, the strip 213 is shifted to the left, so that the extensions 207 will clear the trips 206, the key 202 of the selected total item number wheels is depressed and retained depressed, while the number wheels of the calculating machine are being cleared, by the rotation of the crank thereof. This operation of the number wheels of the calculating machine will be transferred to the total item number wheels, giving the total of the items appearing above the same. Slidably mounted upon the lower strip 213 is an upper strip 218, having a depending extension 219 at its rear end operating within a slot 220 and a slot 221. The upper strip 218 is provided with notches or openings 222, for receiving the upstanding arm 211' with the extensions 212 arranged over the end walls of the openings 222. The upper strip may be moved longitudinally independently of the lower strip, and when so moved to the left it will serve to elevate the shifting plates 208 without turning them upon their pivots, the plates being held against turning movement by the lower strip. This upward movement of the shifting plates 208 will serve to disconnect the item number wheels and the item total number wheels from the number wheels of the calculating machine.

In clearing the item number wheels 180, the strips 213 and 218 are in the inner position. The operator will then depress the bar 190, which will lower the item number wheels 180 so that their lower ends contact with the upper ends of the adjacent clutch elements 185. The crank of the calculating machine is now turned for two complete revolutions and this item wheel will be cleared so that 0 will appear at their openings. To clear the item total wheels, the bar 196 is moved downwardly and the same operation repeated. Both the item number wheels and the total item number wheels may be simultaneously cleared by depressing both bars 190 and 196 at the same time.

The operation of my device is as follows:

The operator inserts the finger or stylus in the links of the operating chain upon the operating board at any desired numeral and draws the chains downwardly until the finger or stylus rises at the end of the slot over-running of the chain being prevented by the mechanism previously described. For instance, suppose the item $23.37 is the desired item, the operator inserts his stylus or finger at "7" in the right-hand slot drawing down the chain, "3" in the second slot from the right, "3" in the third slot from the right and "2" in the 4th slot from the right. The item $23.37 will now appear on the number wheels corresponding to these slots. If it is desired that this item should be separately recorded, the operator during the foregoing operation depresses one of the fingers 202 in the present instance, showing it as being the upper finger. This item will then appear in the corresponding line of figures in the casing 163. The finger 202 is then shifted to the side to indicate that this set of item fingers or wheels has been used. This operation is repeated for each item.

If it is desired to show the total of the items upon the blackboard arrangement, this total is shifted from the adding portion of the machine by depressing one of the fingers 202 which corresponds to one of the sets of the item total wheels and the handle rotated to clear the adding mechanism. When it is desired to clear the item wheels or the item total wheels, this may be accomplished as previously described.

In some instances it may be found desirable to secure the total of but a part of the items being listed. In other words the operator having a list of, say, 15 items may find it desirable to secure separately the totals of, say, the first five items. This total may be secured upon the blackboard by pulling out the lever 213 to the left of the machine, thereby shifting the finger 207 so that it does not engage the member 206. Depressing one of the members 202 and holding it as he tabulates these items upon the machine, each movement of the number wheels on the horizontal shaft is transferred to the horizontal set corresponding to the number depressed, and the total of the items appears.

It is to be understood that the form of my invention herewith shown and described is to be taken as the preferred example of the same, and that various changes in the shape, size and arrangement of parts may be resorted to without departing from the spirit of the invention or the scope of the subjoined claims.

Having thus described my invention, I claim:

1. In a calculating machine, a totalizer comprising a horizontal shaft, a plurality of number wheels arranged thereon, means for operating said number wheels to secure the total of a number of items, a plurality of vertical shafts corresponding in number to the number wheels of said totalizer, means for connecting said vertical shafts to said number wheels, number wheels arranged on said shafts, said wheels being arranged in horizontal sets, and means for connecting the number wheels of any horizontal set to their respective shafts.

2. In a calculating machine, the combination with a horizontal shaft having a plurality of number wheels thereon, means for operating said number wheels to secure the total of a number of items, of means for visibly listing said items, said means including vertical shafts having arranged thereon a plurality of superposed number wheels, said number wheels being arranged in horizontal sets and said shafts corresponding in number and arrangement to the number wheels on said horizontal shaft, means for operably connecting said vertical shafts with the number wheels on said horizontal shaft, and means for operably connecting the number wheels of any of said horizontal sets with said vertical shafts and means for simultaneously connecting all of the superposed number wheels to their respective number wheels to be operated thereby.

3. In a calculating machine, the combination with a horizontal shaft having a plurality of number wheels thereon, means for operating said number wheels to secure the total of a number of items, of means for visibly listing said items comprising a plurality of vertically arranged shafts operatively connected to the number wheels of said horizontal shaft, superposed number wheels carried by said vertical shafts, clutch members secured to said vertical shafts, said superposed number wheels being arranged in horizontal sets, plates connecting the number wheels of each horizontal set, and means for shifting the plate of any set to bring the number wheels thereof into operable engagement with the clutch members.

4. In a calculating machine, a totalizer comprising a horizontal shaft, a plurality of number wheels arranged thereon, means for operating said number wheels to secure the total of a number of items, and a listing device comprising a plurality of vertical shafts corresponding in number to the number wheels on said horizontal shaft and adapted to be connected thereto, a plurality of number wheels arranged on each of said shafts, said number wheels being arranged in horizontal sets, means for operatively connecting the number wheels of any of said horizontal sets with their respective shafts, and means for indicating which of said horizontal sets are in operative position.

5. In a calculating machine, a totalizer comprising a horizontal shaft, a plurality of number wheels arranged thereon, means for operating said number wheels to secure the total of a number of items, transfer mechanism for advancing the next wheel of the series one stop when any of said wheels has completed a revolution, and a listing device comprising a plurality of vertical shafts corresponding in number to the number wheels on said horizontal shaft and operatively connected therewith, a plurality of number wheels arranged on each of said shafts and forming a plurality of horizontal sets, means for operatively connecting the number wheels of any of said horizontal sets to their respective shafts, and means for disconnecting any number wheel of the horizontal set when the corresponding number wheel on the horizontal shaft is being shifted by said transfer mechanism.

6. In a calculating machine, the combination with a horizontal shaft having a plurality of number wheels thereon, means for operating said number wheels to secure the total of a number of items, of means for visibly listing said items comprising a vertical casing, a plurality of vertically arranged shafts rotatably mounted within the casing and operatively connected to the number wheels of said horizontal shaft, superposed number wheels carried by said vertical shafts, clutch members secured to said vertical shafts, said superposed number wheels being arranged in horizontal sets, plates pivotally mounted in the casing and connecting the number wheels of each horizontal set, and means for shifting the plate of any set to bring the number wheels thereof into operable connection with the clutch members.

7. In a calculating machine, the combination with a horizontal shaft having a plurality of number wheels thereon, means for operating the number wheels to secure the total of a number of items, of means for visibly listing said items comprising a vertically disposed casing, a plurality of vertically arranged shafts corresponding in number and arrangement to the number wheels of said horizontal shaft, rotatably mounted in said casing, means for operably connecting said shafts with the number wheels of said horizontal shaft, superposed number wheels carried by said vertical shafts, clutch members secured to said shafts, a plurality of pivotally mounted plates in said casing, said number wheels being arranged in horizontal sets and one of said plates connecting the number wheels of each horizontal set, means for shifting the plate of any set to bring the number wheels thereof into operable engagement with the clutch members, and means for disconnecting the vertical shafts from said number wheels comprising a horizontally disposed lever, and an extension on said pivotally mounted plates, said lever being adapted to engage said extensions when shifted and elevate said plates.

8. In a calculating machine, the combination with a shaft having a plurality of number wheels thereon, means for operating said number wheels to secure the total of a number of items, of means for visibly listing said items, said means including a plurality of number wheels arranged in horizontal and vertical sets, the vertical sets corresponding in number and arrangement to the number wheels on said shaft, means for operatively connecting the number wheels of any of said horizontal sets with the number wheels on said shaft, means for clearing the number wheels on said shaft, and means for visibly listing the total of the items when the number wheels on said horizontal shaft are cleared, said means including number wheels arranged in horizontal and vertical sets, the vertical sets corresponding in number and arrangement to the number wheels on said shaft, and means for operably connecting the number wheels of any of said horizontal sets with the number wheels on said horizontal shaft while the number wheels of said shaft are being cleared, the number wheels of said item total listing sets having the indicia of their faces arranged in reverse order of those on the horizontal shaft in and for the purpose described.

9. In a calculating machine, the combination with a totalizer embodying a plurality of indicia bearing elements and means for operating said elements to secure the total of a number of items, of means for visibly listing said items including a plurality of members corresponding in number and arrangement to the indicia bearing elements of said totalizer, a plurality of indicia bearing elements associated with each of said members and forming a series at right angles to said members, means for connecting said members to the indicia bearing elements of said totalizer to be operated thereby, and means for connecting the indicia bearing elements of any of said series to their respective members to be operated thereby.

10. In a calculating machine, the combination with a totalizer embodying a plurality of indicia bearing elements, carrying mechanism therefor and means for operating said elements to secure the total of a number of items, of means for visibly listing said items including a plurality of members corresponding in number and arrangement to the indicia bearing elements of said totalizer, a plurality of indicia bearing elements associated with each of said members and forming a series at right angles to said members, means for connecting said members to the indicia bearing elements of said totalizer to be operated thereby, means for connecting the indicia bearing elements of any of said series to their respective members to be operated thereby, and means for disconnecting any of said members from the totalizer indicia bearing element to which it is connected when the indicia bearing element is being actuated by said carrying mechanism.

11. In a calculating machine, the combination with a totalizer embodying a plurality of indicia bearing elements and means for operating said elements to secure the total of a number of items, of means for visibly listing said items including a plurality of members corresponding in number and arrangement to the indicia bearing elements of said totalizer, a plurality of indicia bearing elements associated with each of said members and forming a series at right angles to said members, means for connecting said members to the indicia bearing elements of said totalizer to be operated thereby, means for connecting the indicia bearing elements of any of said series to their respective members to be operated thereby, and means for simultaneously connecting all of the indicia bearing elements of all of said series to their associated members to be operated thereby.

12. In a calculating machine, the combination with a horizontal shaft having a plurality of number wheels thereon, means for operating said number wheels to secure the total of a number of items, and transfer mechanism for advancing the next wheel of the series one step when any of said wheels has completed a revolution, of means for visibly listing said items, said means including a plurality of number wheels arranged in horizontal and vertical sets, the vertical sets corresponding in number and arrangement to the number wheels on said shaft, and means for operably connecting the number wheels of any of said horizontal sets with the number wheels on said shaft, means for automatically disconnecting any number wheel of the horizontal set when its corresponding number wheel on the horizontal shaft is being shifted by said transfer mechanism, and means for rendering said automatically disconnecting means for automatically disconnecting inoperative.

13. In a calculating machine, the combination with a horizontal shaft having a plurality of number wheels thereon, means for operating said number wheels to secure the total of a number of items, of means for visibly listing said items comprising a vertical casing, a plurality of vertically arranged shafts rotatably mounted within the casing and operatively connected to the number wheels of said horizontal shaft, superposed number wheels carried by said vertical shafts, clutch members secured to said vertical shafts, said superposed number wheels being arranged in horizontal sets, and means for shifting any of said horizontal sets to bring the number wheels thereof into operable engagement with the clutch members.

In testimony whereof I affix my signature.

HERBERT A. WRENN.